United States Patent
Willey

(10) Patent No.: US 8,011,716 B2
(45) Date of Patent: Sep. 6, 2011

(54) MOTORCYCLE WITH CANTILEVERED FRONT WINDSHIELD

(75) Inventor: Barry A. Willey, Inverness, IL (US)

(73) Assignee: Barry Willey, Inverness, IL (US)

( * ) Notice: Subject to any disclaimer, the term of this patent is extended or adjusted under 35 U.S.C. 154(b) by 0 days.

(21) Appl. No.: 12/700,960

(22) Filed: Feb. 5, 2010

(65) Prior Publication Data

US 2011/0193368 A1 Aug. 11, 2011

(51) Int. Cl.
*B62J 17/04* (2006.01)
(52) U.S. Cl. ...................................... 296/78.1
(58) Field of Classification Search ................ 296/78.1
See application file for complete search history.

(56) References Cited

FOREIGN PATENT DOCUMENTS

| GB | 221326 | * | 9/1924 |
| GB | 689793 | * | 4/1953 |
| JP | 2001-334978 | * | 12/2001 |

* cited by examiner

*Primary Examiner* — Dennis H Pedder
(74) *Attorney, Agent, or Firm* — Vedder Price P.C.

(57) ABSTRACT

An assembly for mounting a windshield on a motorcycle including a mounting bracket and a pivotal master-link that includes a first pivotal connection with the windshield and a second pivotal connection with the mounting bracket that is fixed in relation to a triple clamp of the motorcycle. The assembly provides a cantilevered joint from the windshield to the first pivotal connection, through the master-link, from the master-link to the second pivotal connection and to the triple clamp of the motorcycle.

5 Claims, 5 Drawing Sheets

MOTORCYCLE WITH CANTILEVERED FRONT WINDSHIELD

BACKGROUND

The present invention relates generally to motorcycle windshields, and more particularly, to an apparatus and method for mounting a small, one piece windshield for pivoting movement about two separate axes. Motorcycle riders are sometimes exposed to certain unpleasant and/or annoying conditions and experiences, such as wind pressure when riding at higher speeds, cold temperatures, especially when encountering suddenly changing temperatures, and various kinds of debris. A properly designed assembly for mounting a windshield to a motorcycle will help protect a rider against such conditions.

Large windshields or fairings may overcome several of the problems a motorcycle rider may encounter, such as necessary wind protection. However, large shields are not ideal for mounting on many small- or medium-sized motorcycles because such large windshields are usually mounted to the frame of the motorcycle, do not move with the handlebars or movable or steerable parts of the motorcycle, and are simply too large to be incorporated on a smaller motorcycle. Moreover, the large windshields do not provide a sporty or other desirable look to the motorcycle.

Accordingly, there is or will be a substantial demand for motorcycle windshields that move with the handlebars, and/or are intended to be used with the triple clamp and/or movable or steerable parts of the motorcycle.

SUMMARY

In one embodiment, a windshield, in accordance with the present disclosure, may be mounted on or with respect to the triple clamp, i.e., the part which aligns with the axis of and moves with the handlebars when changing direction of the motorcycle. Other terms may be used for the movable or steerable parts of the motorcycle.

Preferably, a windshield in accordance with one embodiment may be small or compact, lightweight and therefore easily movable with the handlebars. In one aspect, a link may be used to mount the windshield and permit a two-way pivoting movement of the windshield. In other words, the assembly for mounting a windshield to a motorcycle permits adjustment of the windshield with respect to varying degrees of elevation, which degrees are adjustable, up and down with respect to the ground, i.e., higher or lower, and also with respect to varying degrees of inclination, which degrees are adjustable, toward or away from the rider, i.e., more or less upright.

In one embodiment, a windshield mounting assembly may include a compact, readily adjustable mount for or with respect to the so-called triple clamp of the motorcycle. In another embodiment, the windshield mounting assembly may be adjustable in two separate, spaced apart planes or axes.

In yet another embodiment, the mounting assembly may include an apparatus or bracket for connecting the windshield to the triple clamp or other like movable or steerable parts of the motorcycle, where such apparatus or bracket may include one or two links which are pivotally adjustable, both up and down in elevation with respect to a ground surface and both in and out in inclination to the rider, all to various degrees. Other terms may be used for the movable or steerable parts of the motorcycle.

In still another embodiment, the windshield mounting assembly may include a manner of connection to the front forks of the motorcycle. In still yet another embodiment, the windshield mounting assembly may permit the windshield to be free from interference with a headlight, as well as, in another embodiment, free from interference with one or more instruments or instrument clusters.

In a further embodiment, the windshield mounting assembly may include a pair of planar adjustment links which enable a headlight or instrument cluster to be disposed in a space between the links. In a still further embodiment, the windshield mounting assembly may include a pair of planar links, both of which are secured by fasteners which are in turn connected to the windshield.

In a yet still further embodiment, the adjustably mounted windshield may include an integral mounting bracket having integral mounting ears disposed or formed thereon. In another embodiment, the windshield mounting assembly may include different means of mounting the handlebar clamps and/or risers.

BRIEF DESCRIPTION OF THE DRAWINGS

Certain embodiments are shown in the drawings. However, it is understood that the present disclosure is not limited to the arrangements and instrumentality shown in the attached drawings, wherein.

DETAILED DESCRIPTION

Figure 1:
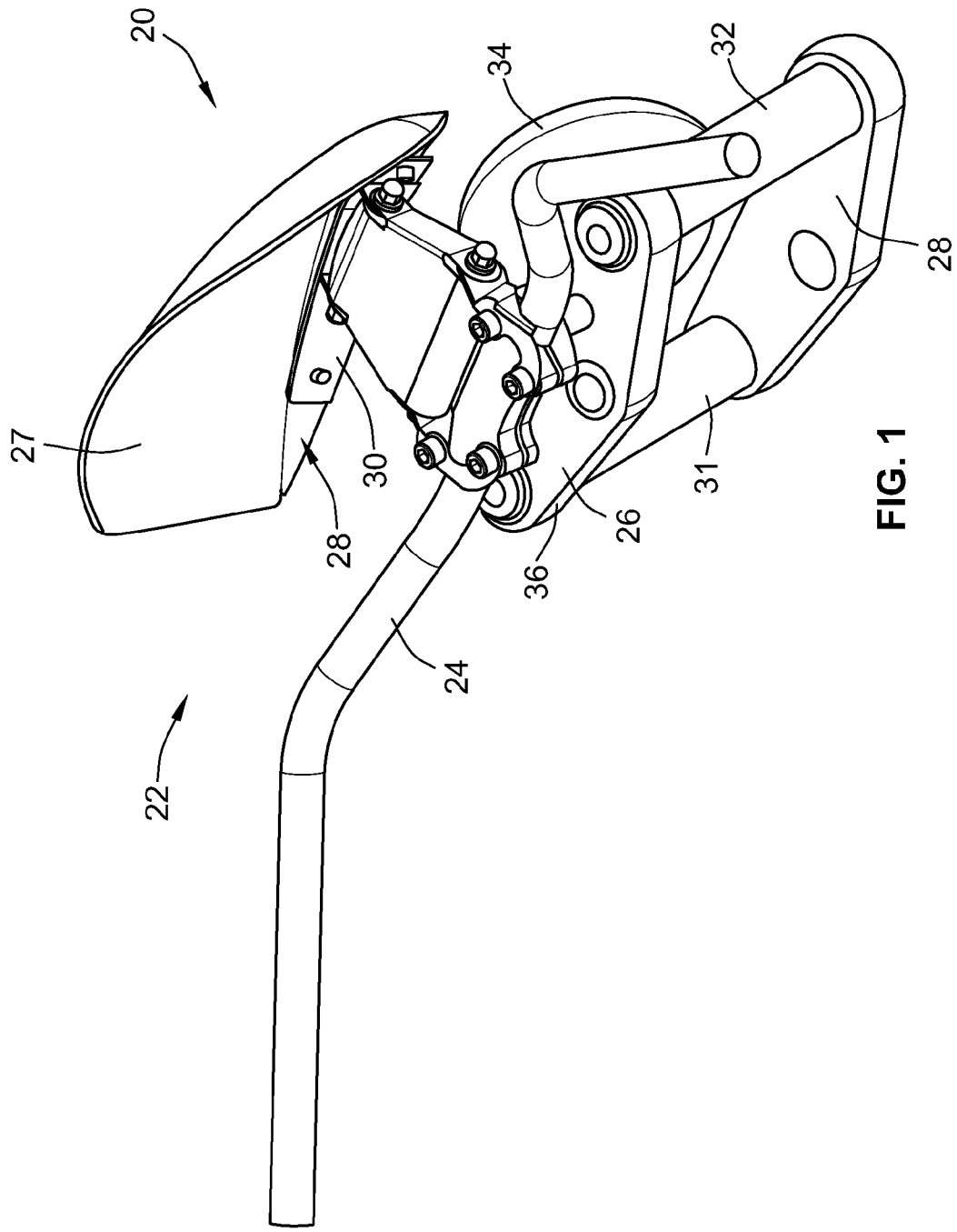
FIG. 1 is a perspective view showing one embodiment of a mounting assembly showing a windshield mounting link having front and rear pivot axes and a windshield mounted for movement with respect to such axes.

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which this disclosure relates.

Figure 2:
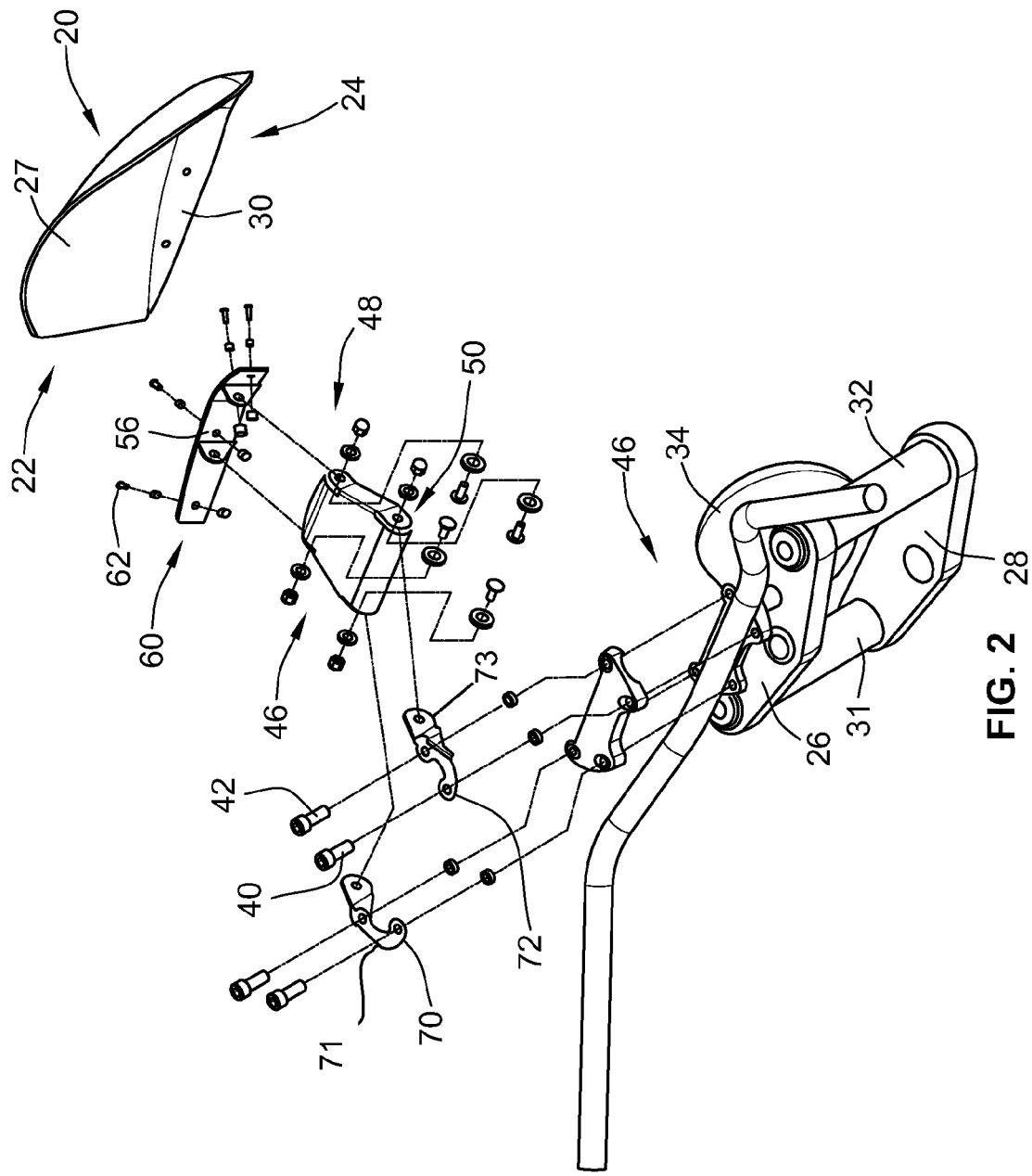
FIG. 2 is an exploded view of the windshield of FIG. 1, showing certain details of the mounting link and other components.

Referring now to the drawings in greater detail, and in particular to FIGS. 1 and 2, there is shown a windshield mounting assembly 20 for mounting on a motorcycle generally designated 22 (a substantial portion of which is shown show for clarity, but will be understood to have a conventional configuration). The motorcycle 22 may include handlebars 24 attached to portions associated with the upper 26 and lower 28 triple clamps. The windshield has an upper portion 27 that is preferably transparent and a lower portion 29 that may include a mounting bracket 30. The motorcycle 22 may also include fork tubes 31, 32 which are held in a generally vertical, but somewhat inclined position by the upper 26 and lower 28 triple clamps. The fork tubes 31, 32 support the front end of the motorcycle 22, and in particular, they support or facilitate mounting of the headlight 34. In one embodiment, two pair of fasteners 40, 42, for example, bolts, may be used to connect a handle bar clamp 45 to the triple clamp in a desired position.

Referring now in particular to FIG. 2, there is shown generally a swingable or master-link 46 having a front pivot axis 48 oriented generally perpendicular to the longitudinal axis of the master-link 46 and a rear pivot axis 50 oriented generally perpendicular to the longitudinal axis of the master-link 46. It is within the teachings of the present disclosure that the front or first pivot axis 48 and the rear or second pivot axis 50 are disposed generally parallel. The master-link 46 extends between the first pivot axis 48 and the second pivot axis 50 to define a confined but swinging movement.

A first pivotal connection is formed or defined when the front pivot axis 48 of the link 46 is connected to the bracket 30. The bracket 30 may be connected to the lower portion 29 of the windshield by fasteners 62 and preferably includes ears 64 extending generally perpendicular to the bracket 60 to facilitate a first pivotal connection of the bracket 30 to the master-link 46 via fasteners 61. Consequently, the first pivotal connection permits the bracket 30 to be moved with a pivoting action with respect to the link 46 so as to enable angular adjustment of the angle of inclination of the windshield, i.e., a generally vertically oriented angular adjustment, which will be explained in detail herein.

A second pivotal connection is formed or defined when the rear pivot axis 50 of the link 46 is connected to the ears 70, 72 of a mounting bracket 71, 73, respectively, via fasteners 69. The mounting brackets 71, 73 are preferably connected to the triple clamp 26 by fasteners 40, 42. Consequently, the second pivotal connection permits the master-link 46 to be moved with a pivoting action with respect to the mounting brackets 71, 73 so as to enable angular adjustment of the angle of elevation of the windshield, i.e., a generally horizontally oriented angular adjustment, which will be explained in detail herein.

Figure 3:
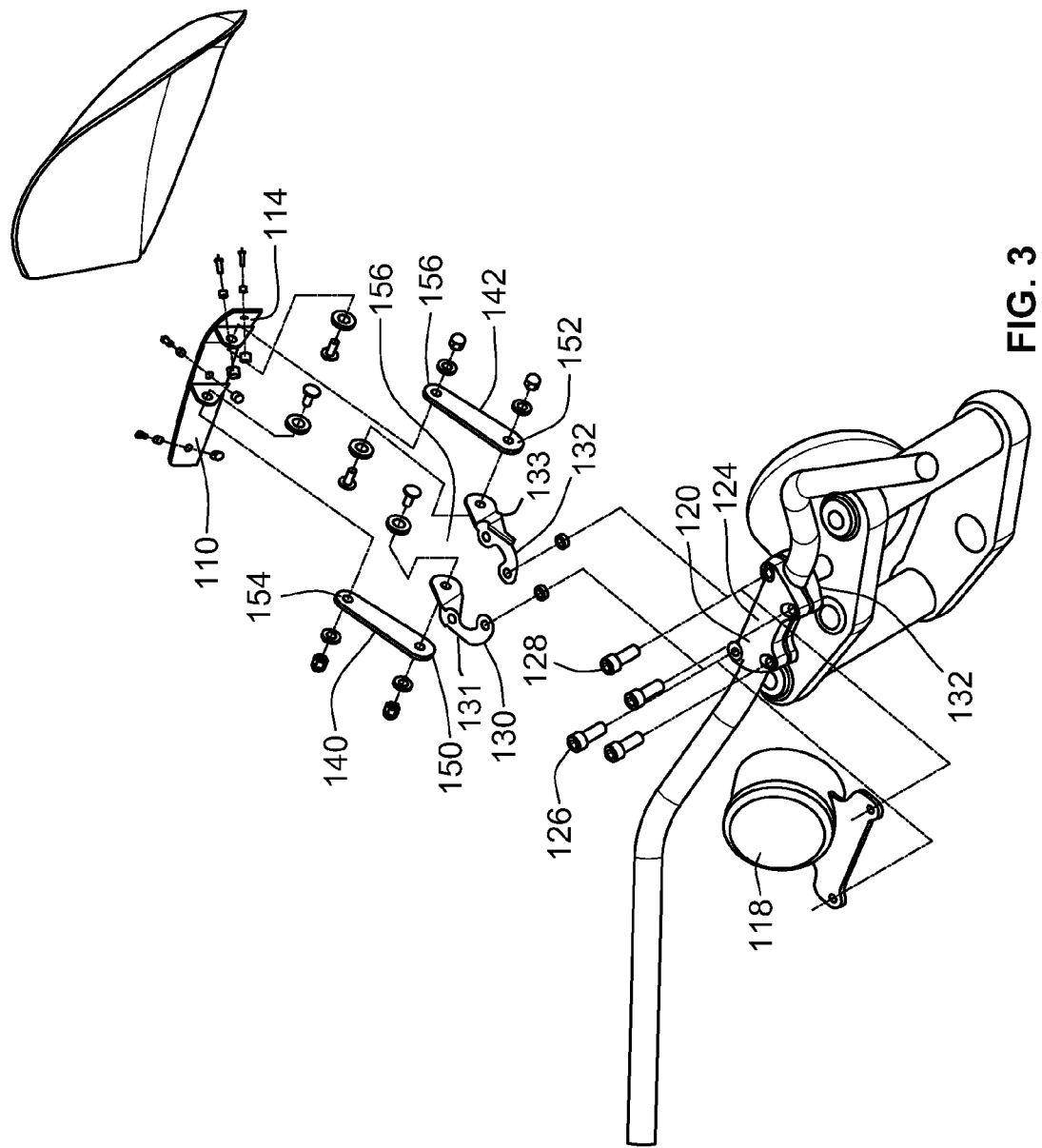
FIG. 3 is an exploded view of another embodiment of the windshield, showing a pair of planar links used to mount the windshield.

FIG. 3 illustrates one an embodiment of the present disclosure, wherein the bracket 110 and includes flanges 114 that facilitate connection of the bracket 110 to the lower portion 29 of the windshield. An instrument cluster 118 may also be connected to the handle bar clamp 120 and in turn to the triple clamp 132 by the fasteners 126, 128. The instrument cluster 118 may comprise one dial or several dials. The ears 130, 132 and brackets 131, 133 are generally similar to the same components (mounting brackets 71, 73 and ears 70, 72) as shown in FIG. 2. The master-link is defined in this embodiment by a pair of separate links 140, 142 that each have an aperture at the front or first end 154, 156 to define or form a front or first pivot axis and at the rear or second end 150, 152 to define or form a rear or second pivot axis.

The first pivotal connection is formed or defined when the front pivot axis disposed at the front or distal end 154, 156 of the link 46 is connected to ears of the bracket 110 via fasteners, as generally described herein. Likewise, the first pivotal connection permits the bracket 110 to be moved with a pivoting action with respect to the master-link 46 so as to enable angular adjustment of the angle of inclination of the windshield, i.e., a generally vertically oriented angular adjustment, which will be explained in detail herein.

A second pivotal connection is formed or defined when the rear pivot axis disposed at the rear or proximal end 150, 152 of the link 46 is connected to the ears 130, 132 of a mounting brackets 131, 133, respectively, via fasteners. Likewise, the second pivotal connection permits the master-link 46 to be moved with a pivoting action with respect to the mounting brackets 131, 133 so as to enable angular adjustment of the angle of elevation of the windshield, i.e., a generally horizontally oriented angular adjustment, which will be explained in detail herein.

The manner of connection and functionality of the master-link 46 in this embodiment to the bracket 110 and the mounting brackets 131, 133 is the same as described herein, except that, instead of an integrally formed master-link as shown in FIG. 2, there are separate links 140, 142. The links 140, 142 define a space generally designated 156 in between them for receipt of the instrument cluster 118. The links 140, 142 have the same range of motion and the same type of motion undergone by their counterparts, the master-link 46.

Figure 4:
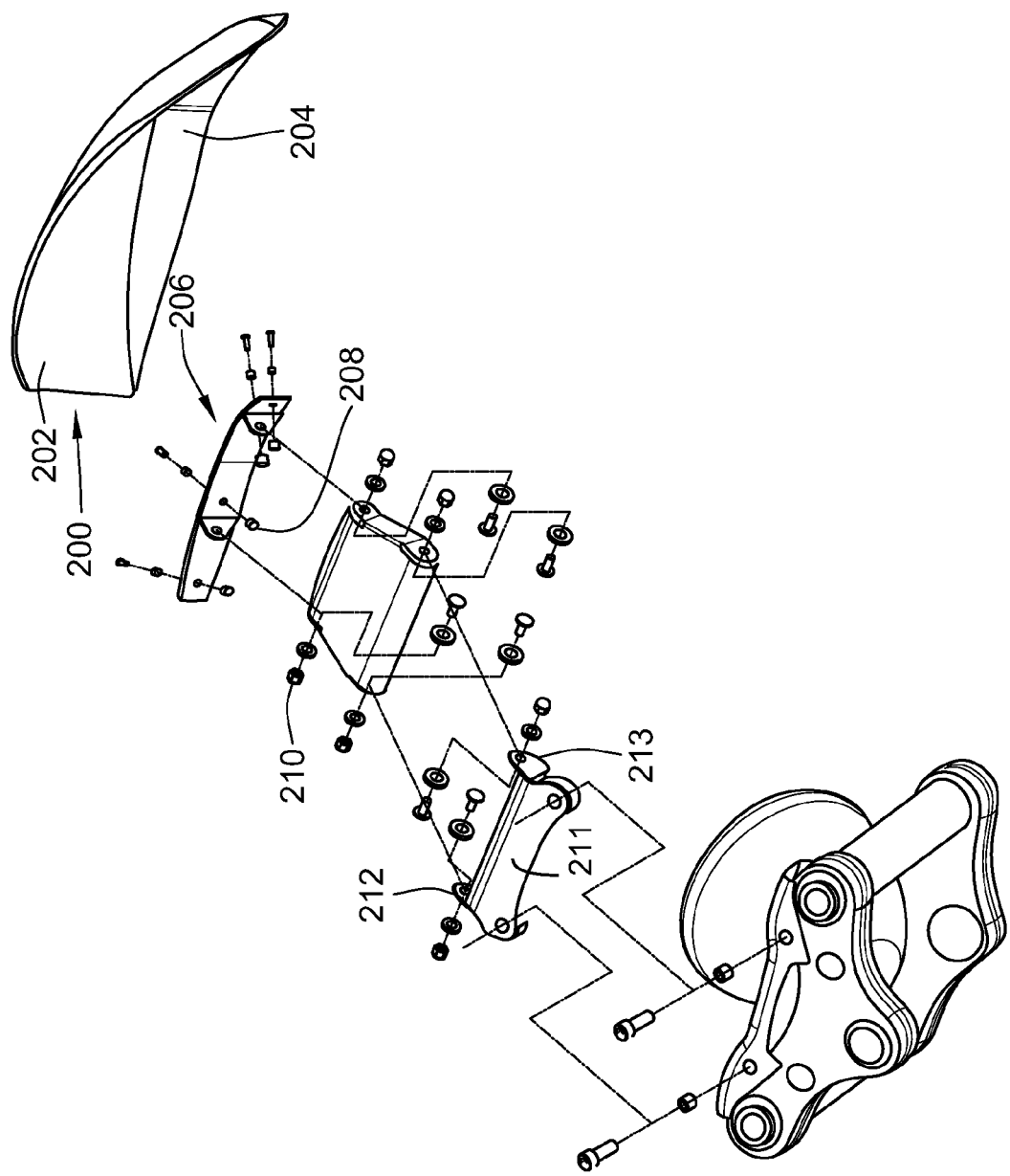
FIG. 4 is another embodiment showing another form of mounting the mounting link.

Referring now to FIG. 4, the windshield 200 may include a transparent upper portion 202, and a lower portion 204 which is suitable to be fastened by the bracket 206 employing the fasteners 208, and the flanges 212, 213. The embodiment illustrated in FIG. 4 differs from the embodiment shown in FIG. 3 in that the mounting bracket 211 of FIG. 4 is integrally formed as opposed to the mounting brackets 71, 73 shown in FIG. 2 and 131, 133 shown in FIG. 3 which are individually, separately formed. Consequently, the mounting bracket 211 uses only two fasteners. It is within the teachings of the present invention that the mounting bracket 211 may be formed as a handle bar clamp and may also include ears 212, 213 that provide the similar functionality as with respect to ears 70, 72 and 130, 132.

Figure 5A:
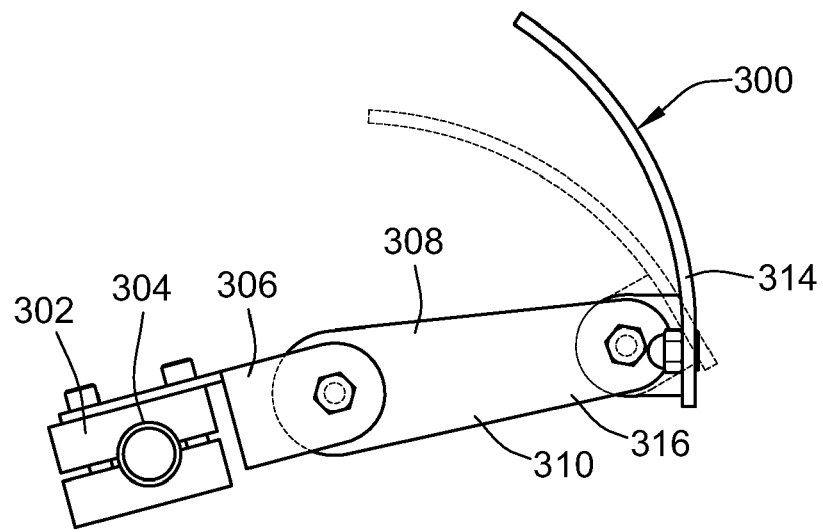
FIG. 5A is a side elevation view of one embodiment showing the windshield and one embodiment of the mounting assembly providing an adjustable windshield angle of inclination wherein a first orientation is shown in solid lines, and a second orientation is shown in phantom lines.
Figure 5B:
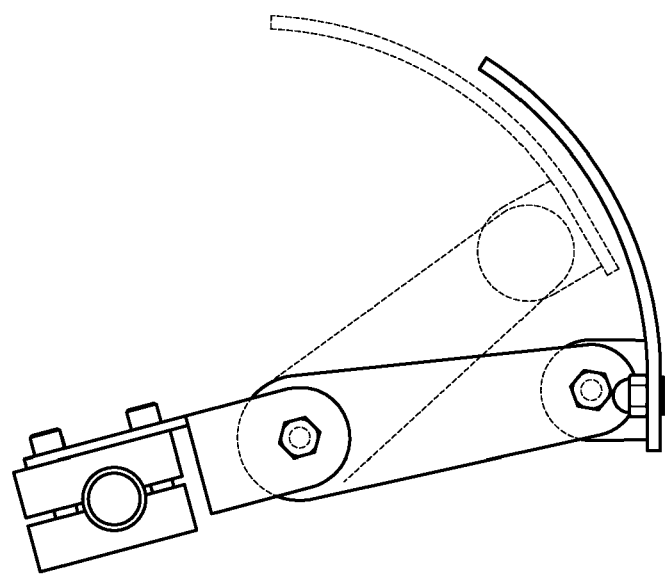
FIG. 5B is a side elevation view similar to FIG. 5A, but showing one embodiment of the windshield and the mounting assembly providing an adjustable windshield elevation wherein a first position is shown in solid lines, and a second position is shown in phantom lines.

Referring now to FIGS. 5A and 5B, embodiments of the functionality of the mounting assembly and the windshield are shown. In FIG. 5A, the solid lines show an example of the windshield 300 in place with the windshield 300 being held in place by the handlebar clamp 302 held fixed to the handlebar 304 and holding the mounting bracket 306 including the master-link 308 with the second pivot axis about which the master-link 308 is fixed in this embodiment. The movable windshield ear 312 holds the windshield 314 for movement about the first or front pivot axis, as shown in the phantom lines throughout a limited range. Thus, the movable windshield also has a limited range of motion. As shown in FIG. 5B, the master-link 308 may be moved can move within the greater limits afforded by the longer arm about the second pivot axis.

It will thus be seen that the present disclosure provides a new and unusual configuration for windshields, having a number of advantages, including those pointed out herein and others which are inherent in the disclosure.

The preceding detailed description is merely some examples and embodiments of the present disclosure and that numerous changes to the disclosed embodiments can be made in accordance with the disclosure herein without departing from its spirit or scope. The preceding description, therefore, is not meant to limit the scope of the disclosure but to provide sufficient disclosure to one of ordinary skill in the art to practice the invention without undue burden.

What is claimed is:

1. An assembly for mounting a small motorcycle windshield on a motorcycle comprising: a mounting bracket connected to a triple clamp of the motorcycle and a pivotal master-link pivotally connected to the bracket and the windshield, the master-link including a first pivot axis defined by a first pivotal connection between said windshield and a distal portion of the master-link and a second pivot axis defined by a second pivotal connection between a proximal portion of the master-link and a pair of ears on the mounting bracket that are fixed in relation to the triple clamp of said motorcycle, said assembly thus providing a cantilevered joint from the windshield to the first pivotal connection, through the master-link, from the master-link to the second pivotal connection and to the triple clamp of the motorcycle wherein the first pivotal connection facilitates angular adjustment of an angle of inclination of the windshield, the second pivotal connection facilitates angular adjustment of an angle of elevation of the windshield and the adjustment of the angle of inclination is independent of the adjustment of the angle of elevation.

2. An assembly as defined in claim 1, wherein said motorcycle has two wheels only.

3. An assembly as defined in claim 1, wherein said motorcycle has three or more wheels.

4. An assembly as defined in claim 1, wherein the master-link is defined by a pair of links that define an opening between said links and further comprising a headlight disposed below said pair of links.

5. An assembly as defined in claim 1, wherein the master-link is defined by a pair of links that define an opening between said links and further comprising an instrument disposed between said pair of links.

* * * * *